United States Patent
Itkin et al.

(10) Patent No.: US 10,382,396 B2
(45) Date of Patent: Aug. 13, 2019

(54) UTILIZING MANAGEMENT NETWORK FOR SECURED CONFIGURATION AND PLATFORM MANAGEMENT

(71) Applicant: Mellanox Technologies, Ltd., Yokneam (IL)

(72) Inventors: Yuval Itkin, Zoran (IL); Tal Anker, Ramat Gan (IL); Dror Goldenberg, Zichron Yaakov (IL)

(73) Assignee: Mellanox Technologies, Ltd., Yokneam (IL)

( * ) Notice: Subject to any disclaimer, the term of this patent is extended or adjusted under 35 U.S.C. 154(b) by 26 days.

(21) Appl. No.: 15/391,894

(22) Filed: Dec. 28, 2016

(65) Prior Publication Data
US 2018/0183758 A1    Jun. 28, 2018

(51) Int. Cl.
*G06F 21/00* (2013.01)
*H04L 29/06* (2006.01)
*H04L 12/24* (2006.01)

(52) U.S. Cl.
CPC .......... *H04L 63/0236* (2013.01); *H04L 41/28* (2013.01); *H04L 63/10* (2013.01); *H04L 63/101* (2013.01); *H04L 63/18* (2013.01); *H04L 63/20* (2013.01); *H04L 63/0428* (2013.01)

(58) Field of Classification Search
CPC ... H04L 63/0236; H04L 63/101; H04L 63/20; H04L 63/18; H04L 63/10; H04L 41/28; H04L 63/0428
See application file for complete search history.

(56) References Cited

U.S. PATENT DOCUMENTS

| | | |
|---|---|---|
| 6,367,035 B1 | 4/2002 | White |
| 6,839,789 B2 | 1/2005 | Krämer et al. |
| 8,542,689 B2 | 9/2013 | Davis |
| 8,705,545 B2 | 4/2014 | Reed et al. |
| 9,872,205 B2 * | 1/2018 | Shah ...................... H04W 28/14 |
| 2002/0162026 A1 * | 10/2002 | Neuman ............. H04L 63/0227 726/4 |
| 2003/0026260 A1 * | 2/2003 | Ogasawara ......... H04L 12/4633 370/392 |
| 2003/0145045 A1 | 7/2003 | Pellegrino et al. |
| 2007/0115981 A1 | 5/2007 | Jreij et al. |
| 2008/0005222 A1 | 1/2008 | Lambert et al. |
| 2008/0043769 A1 | 2/2008 | Hirai |
| 2011/0040917 A1 * | 2/2011 | Lambert ................. H04L 69/18 710/301 |
| 2014/0258738 A1 | 9/2014 | Greenwalt et al. |
| 2015/0172112 A1 | 6/2015 | Itkin et al. |

(Continued)

FOREIGN PATENT DOCUMENTS

CN        106227636 A    12/2016

OTHER PUBLICATIONS

NIC with Embedded Firewall. Apr. 29, 2002. (Year: 2002).*

(Continued)

*Primary Examiner* — Kendall Dolly
(74) *Attorney, Agent, or Firm* — Kligler & Associates

(57) ABSTRACT

A network connection device having a security processor exchanges data traffic between a data network and a host computer via a network port. Security management data is exchanged exclusively between the security processor and a management network via a management network connectivity port that is inaccessible to the data traffic.

8 Claims, 2 Drawing Sheets

(56) References Cited

U.S. PATENT DOCUMENTS

| | | |
|---|---|---|
| 2015/0215343 A1 | 7/2015 | Itkin et al. |
| 2016/0248619 A1 | 8/2016 | Itkin |
| 2016/0248620 A1 | 8/2016 | Itkin |
| 2016/0283513 A1 | 9/2016 | Antony |
| 2017/0104770 A1 | 4/2017 | Jreij et al. |

OTHER PUBLICATIONS

Intelligent Platform Management Interface. Dec. 10, 2016. (Year: 2016).*
InfiniBand TM Architecture Specification, vol. 1, Release 1.2.1, 1727 pages, Nov. 2007 Copyright.
Itkin et al., U.S. Appl. No. 15/051,750, filed Feb. 24, 2016.
PCI Express® Base Specification, Revision 3.1 , 1073 pages, Mar. 2014.
European Application # 17209619 search report dated Feb. 8, 2018.
Intel., "PRO/1000 PT Dual Port Server Adapter", 4 pages, Jan. 1, 2006.
Anonymous., "NIC with embedded firewall", Geek.com, 9 pages, Apr. 29, 2002.
Anonymous., "Intelligent Platform Management Interface", Wikipedia, 8 pages, Dec. 10, 2016.
U.S. Appl. No. 15/051,750 office action dated Feb. 27, 2018.
DMTF DSP0222, "Network Controller Sideband Interface (NC-SI) Specification", version 1.1.0, 138 pages, Sep. 23, 2015.
Intel, "NC-SI Overview and Performance", Revision 1.1, 27 pages, Mar. 2013.
U.S. Appl. No. 15/051,750 office action dated Jun. 6, 2018.
EP Application # 17209619.0 office action dated Feb. 22, 2019.
U.S. Appl. No. 16/416,224, office action dated Jun. 14, 2019.

* cited by examiner

UTILIZING MANAGEMENT NETWORK FOR SECURED CONFIGURATION AND PLATFORM MANAGEMENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to network arrangements and protocols for real-time communications. More particularly, this invention relates to security aspects in the management of network interface devices.

2. Description of the Related Art

The meanings of certain acronyms and abbreviations used herein are given in Table 1.

TABLE 1

Acronyms and Abbreviations

| | |
|---|---|
| ACL | Access Control List |
| BMC | Baseboard Management Controller |
| CPU | Central Processing Unit |
| DMTF | Distributed Management Task Force |
| MCTP | Management Component Transport Protocol |
| NC-SI | Network Controller Sideband Interface |
| NIC | Network Interface Card |
| PCI | Peripheral Component Interconnect |
| PCIe | PCI Express |
| RBT | RMII Based Transport |
| RMII | Reduced Media-Independent Interface |
| SMBus | System Management Bus |

In modern computing systems, a data center may comprise a cluster of servers, which are locally or remotely managed by a host manager. Typically, server parameters such as operating system settings, boot parameters and bus configuration, e.g., PCIe configuration, may be controlled by the host manager.

For example, commonly assigned U.S. Patent Application Publication No. 2015/0215343, which is herein incorporated by reference, describes an arrangement in which host management is mediated by a network adaptor whose ports are configured to connect to a switch in a communication network. The circuitry is coupled to a network node that includes multiple hosts, and is configured to exchange management packets between a control server and multiple baseboard management controller units associated respectively with the multiple hosts, and to exchange data packets between the hosts and one or more remote nodes.

SUMMARY OF THE INVENTION

The concept of using a separate management network is common in data centers where physical separation of the management network is needed. Embodiments of the invention address the capability of secured configuration of smart network connection devices like Intelligent NIC (Network Interface Cards), which host security processors in addition to the traditional network connectivity function.

Conventionally platforms use the local host processor in a compute server to manage resources on the compute server. This method is not secure in the sense that the same physical CPU, which hosts the regular traffic is used to control and configure security and networking-related settings. If the host processor security is compromised, the integrity of security-related settings is no longer assured. Furthermore, some deployment scenarios, such as remote mass insertion of an operating system or hypervisor via the Internet, so-called "bare metal provisioning", potentially allow a tenant to take full control of its host. Specifically, the tenant could control the NIC of the host (and also the virtual edge bridge hardware implementation if the NIC supports it), and thus could inject packets into a data networks as it sees fit. This presents a security risk to a cloud provider.

Embodiments of the invention solve a need in an intelligent network device to isolate its security and network configuration functions from the host processor, as the latter may be vulnerable to malware executing in the host. Remote control and monitoring of security and network capabilities of the network device are enabled in a secured manner, and cannot be compromised by malicious code running on the host. The network device is fully compatible with current industry-standard platforms, with no changes in hardware of firmware.

There is provided according to embodiments of the invention a method, which is carried out by providing a network connection device having a network port and a security processor and exchanging data traffic between a data network and a host computer via the network port of the network connection device. The method is further carried out by exchanging security management data exclusively between the security processor and a management network via a management network connectivity port that is inaccessible to the data traffic.

According to one aspect of the method, the management network connectivity port is integral with the network connection device.

According to a further aspect of the method, the management network connectivity port is disposed in a baseboard management controller that is connected to a sideband interface of the network connection device.

According to yet another aspect of the method, the baseboard management controller produces traffic directed to the sideband interface.

According to still another aspect of the method, the security processor performs encryption and decryption of the data traffic.

According to an additional aspect of the method, the security processor manages access control lists.

There is further provided according to embodiments of the invention an apparatus, including a network connection device having a network port, a management network connectivity port that is inaccessible to data traffic and a security processor. The network connection device is configured for exchanging the data traffic between a data network and a host computer via the network port, and exchanging security management data exclusively between the security processor and a management network via the management network connectivity port.

According to an aspect of the apparatus, the management network connectivity port is integral with the network connection device.

Still another aspect of the apparatus includes a sideband interface in the network connection device, and a baseboard management controller connected to the sideband interface, wherein the management network connectivity port is disposed in the baseboard management controller.

According to another aspect of the apparatus, the baseboard management controller includes a control interface for connection to the host computer, and a switch for separating traffic of the management network connectivity port from traffic from the host computer.

According to yet another aspect of the apparatus, the baseboard management controller produces traffic directed to the sideband interface.

According to a further aspect of the apparatus, the security processor performs encryption and decryption of the data traffic.

According to one aspect of the apparatus, the security processor manages access control lists.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

First Embodiment

In this embodiment a management network, which is isolated from the external data network, is the sole owner of security control elements. The management network port is shared by a baseboard management controller (BMC) and a security function control provider. The baseboard management controller is a management controller device, which is not part of the host CPU. Rather it is a specialized service processor that monitors the physical state of a computer, network server or other hardware device using sensors and communicating with a system administrator through an independent connection.

The management network cannot be accessed from the threatened data network, should a tenant seize control.

Figure 1:
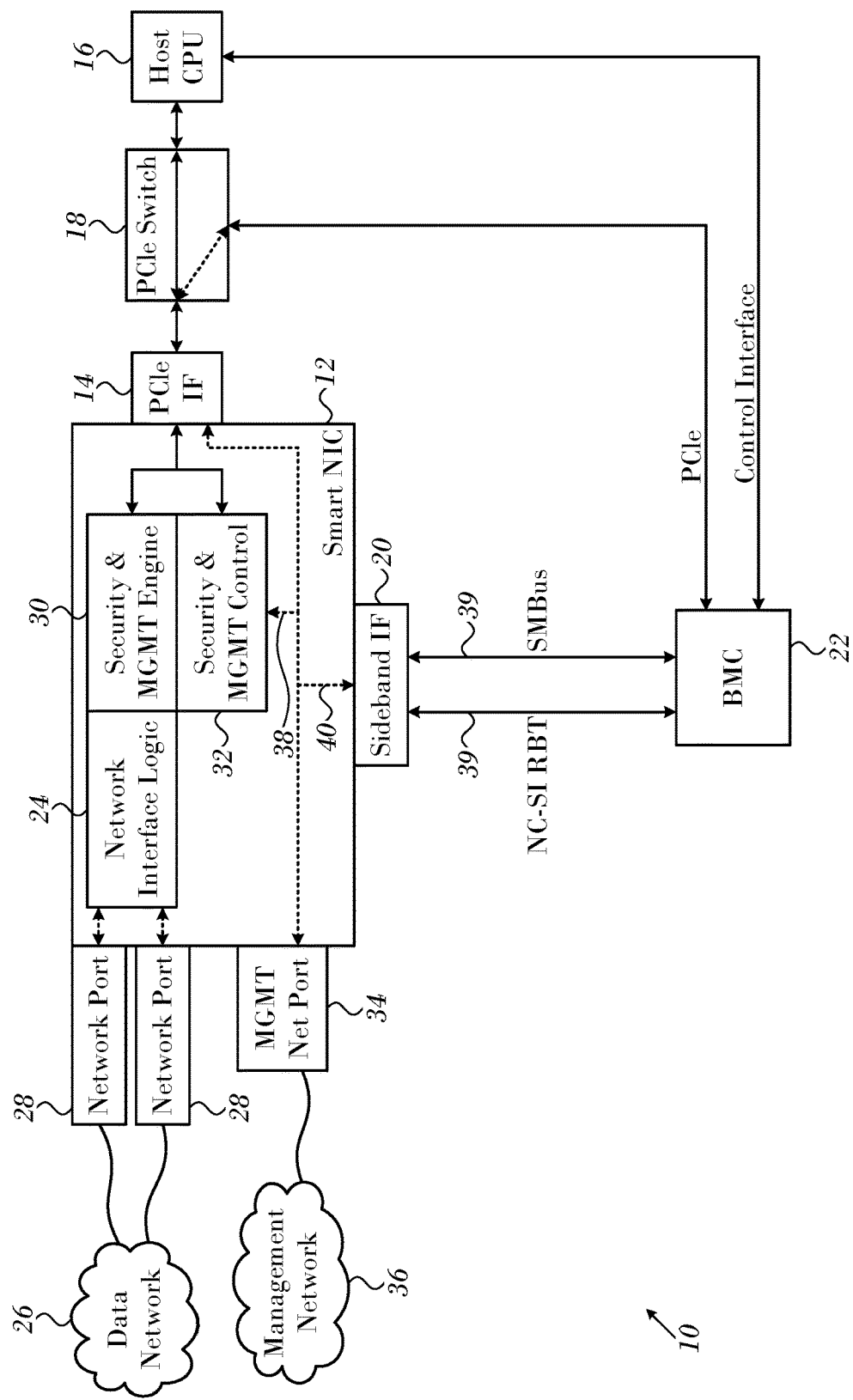
FIG. 1 is a block diagram of an arrangement that utilizes a management network to configure and manage a platform in accordance with an embodiment of the invention.

Reference is now made to FIG. 1, which is a block diagram of an exemplary arrangement 10 that utilizes a management network to securely configure and manage a platform in accordance with an embodiment of the invention. In this example the platform is a network device 12, e.g., a network interface card having programmable features, known as a "smart NIC". The network device 12 has a PCIe interface 14 linked to a host central processing unit 16 through a PCIe switch 18. The network device 12 has a sideband interface 20 linked to a baseboard management controller 22. The baseboard management controller 22 communicates with switch 18 and to host central processing unit 16 via a control interface.

Data is exchanged between the logical circuitry 24, network device 12 and a data network 26 through network ports 28. The network device 12 has a configurable security and management engine 30 that oversees movement of data from the circuitry 24 to the PCIe interface 14 and eventually to the host to be acted upon by the host central processing unit 16. Administration of the security and management engine 30 is provided by security control logic 32. Security and management engine 30 protects the host with security features such as personal identification and authentication. Such security features may include, e.g., control of security keys for decoding and encryption of secured data traffic in embodiments where the encryption/decryption operations are implemented within the security and management engine 30. Other security features may also include enforcement of traffic identification rules through the use of access control lists (ACL).

Data flows of network data and security management traffic are shown as solid and broken lines, respectively. A management network connectivity port, management port 34, is linked to a management network 36 that is isolated from the data network 26. The connection of the management network 36 through the management port 34 to the baseboard management controller 22 can be any suitable sideband interface, e.g., DMTF defined NC-SI interfaces (RBT, SMBus and PCIe). Using the management port 34 the security control logic 32 is controlled by a remote management host (not shown) that is hidden by the management network 36. The host central processing unit 16 is removed from a security control path 38 that is represented by a line that extends between the management port 34 and security control logic 32. Security-related traffic going through the PCIe interface 14 and reaching the baseboard management controller 22 (represented by path 40) is isolated from data traffic related to the host central processing unit 16 by switch 18. Similarly, security related configurations going through the sideband interface 20 from the baseboard management controller 22 (represented by path 39) is isolated from the traffic produced by the host central processing unit 16. In this way, the security and management engine 30 is mediated by the management network 36 and is under control of a remote management host via the management network 36 and management port 34. The security and management engine 30 cannot be controlled by the host central processing unit 16.

Use of MCTP over PCIe for controlling the embedded security engine is only allowed when full isolation is assured on the PCIe fabric in which case:

Any MCTP over PCIe traffic arriving at the smart network device 12 over the PCIe interface 14 can only originate from the baseboard management controller 22. No MCTP over PCIe traffic originating from the baseboard management controller 22 and directed to the network device 12 can be routed to any destination other than the PCIe interface 14. Similarly, all MCTP over PCIe traffic, which is originated by the network device 12 over the PCIe interface 14 and directed to the baseboard management controller 22 can only be forwarded to the baseboard management controller 22, and is not accessible to any other entity such as the local host central processing unit 16. Additionally, no MCTP traffic that is marked as originating from the network device 12 may reach the baseboard management controller 22 if it was not explicitly sent from the network device 12. If no isolation is possible, then only RBT and SMBus are used for the connection between the baseboard management controller 22 and the network device 12. These sideband interfaces are connected directly between the network device 12 and the baseboard management controller 22 with no additional devices connected to these side-band interfaces.

The arrangement 10 solves a need in an intelligent device to isolate security and network configuration functions from the host central processing unit 16, as the latter may be vulnerable should malware take control of the network device 12. Remote control and monitoring of the isolated security and network capabilities are enabled in a secured manner, and cannot be compromised by malicious code running on the host. The network device 12 is fully compatible with current industry-standard platforms, with no changes in hardware of firmware.

Second Embodiment in this embodiment the secured section of an intelligent network device, such as a smart NIC, connects to the management network through the sideband interface, but can only be configured by the baseboard management controller. The embedded security functionality acts as if there were a hidden host that controls and configures the security and the network functions, removing the host CPU from the security control path, and isolating the local host central processing unit 16 from the network-control path as in the previous embodiment. However, in this embodiment the embedded security function is connected to the management network over existing sideband interfaces via an enhanced baseboard management controller, which offers a dedicated management interface port. As in the previous embodiment, the use of MCTP over PCIe for controlling the embedded security engine is only allowed when full isolation is assured on the PCIe fabric. If no isolation is possible, then only RBT and SMBus are used for the connection of the baseboard management controller and the intelligent network device.

Figure 2:
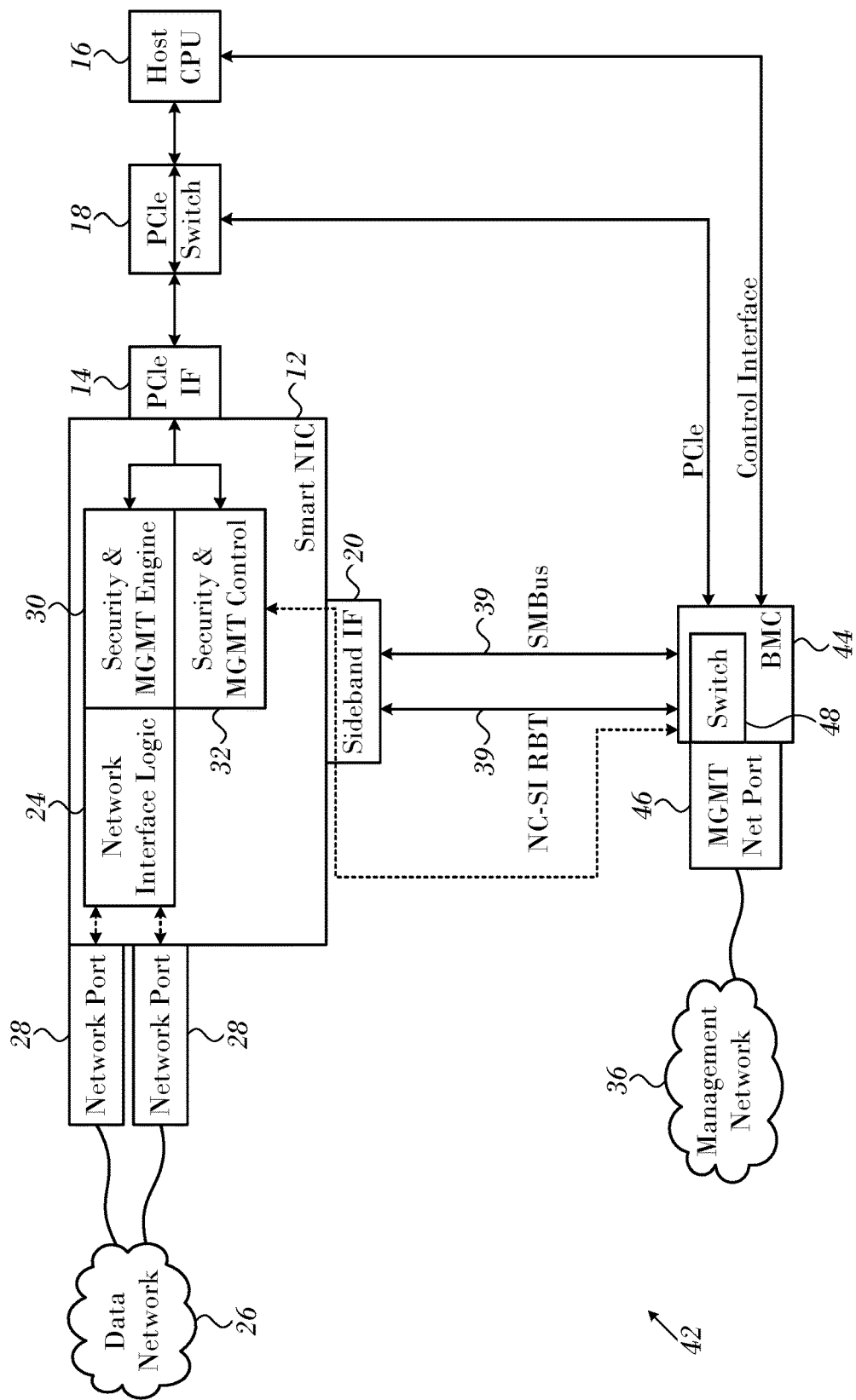
FIG. 2 is a block diagram of an arrangement that utilizes a management network to configure and manage a platform in accordance with an alternate embodiment of the invention.

Reference is now made to FIG. 2, which is a block diagram of an arrangement 42 that utilizes a management network to securely configure and manage a platform in accordance with an alternate embodiment of the invention. In this embodiment the baseboard management controller is a producer of traffic, rather than a conventional consumer of traffic, and the arrangement 42 is therefore referred to as operating in a "reverse NC-SI mode". A baseboard management controller 44 connects to the sideband interface 20, switch 18 and host central processing unit 16 as in the previous embodiment. The baseboard management controller 44 is enhanced by a management network connectivity port 46, which exchanges data with management network 36. The security control logic 32 receives management traffic only through the port 46 and the baseboard management controller 44. The host central processing unit 16 cannot influence the security control logic 32 and the security and management engine 30. A network switch 48 is included in the baseboard management controller 44 to separate traffic relating to port 46 from traffic relating to the host central processing unit 16. The switch 48 cannot be controlled by the central processing unit 16, so that its function cannot be affected by malware in the host.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for isolating security management data in a network, comprising the steps of:
   connecting a host computer to a network connection device having a network port, access to a management network connectivity port, a sideband interface and a security processor;
   connecting a baseboard management controller to the sideband interface, wherein the management network connectivity port is disposed in the baseboard management controller;
   exchanging data traffic on a first path that extends between a data network and the host computer via the network port of the network connection device;
   isolating security and network configuration functions of the network connection device from the host computer by exchanging security management data relevant to the security and network configuration functions between the security processor and a management host on a management network via a second path that extends from the security processor to the management host via the management network connectivity port;
   directing the second path from the management network connectivity port to the security processor via the sideband interface; and
   with the baseboard management controller producing traffic directed to the sideband interface for configuring the security processor.

2. The method according to claim 1, wherein the management network connectivity port is integral with the network connection device.

3. The method according to claim 1, wherein the security processor performs encryption and decryption of the data traffic.

4. The method according to claim 1, wherein the security processor manages an access control list.

5. An apparatus, comprising:
   a network interface device comprising:
   a network port, configured for connection to a data network so as to exchange data traffic between the data network and a host computer on a first path;
   a sideband interface; and
   a security processor configured to control security and network configuration functions of the network interface device;
   a baseboard management controller connected to the sideband interface;
   a management network connectivity port in the baseboard management controller that is connectable to a management network, and operative for exchanging security management data relevant to the security and network configuration functions between the security processor and a management host on the management network via a second path that extends from the security processor to the management host via the management network connectivity port, wherein the basement management controller is operative for producing traffic directed to the sideband interface for configuring the security processor; and a switch in the baseboard management controller that provides access for the security management data to the security processor on the second path via the sideband interface and operative to separate the security management data from traffic related to the host computer.

6. The apparatus according to claim 5, wherein the baseboard management controller comprises:

a control interface for communicating with the host computer.

7. The apparatus according to claim 5, wherein the security processor performs encryption and decryption of the data traffic.

8. The apparatus according to claim 5, wherein the security processor manages an access control list.

\* \* \* \* \*